United States Patent [19]
Sano

[11] Patent Number: 5,697,083
[45] Date of Patent: Dec. 9, 1997

[54] DIVERSITY RECEIVER

[75] Inventor: Hiroyasu Sano, Kamakura, Japan

[73] Assignee: Mitsubishi Denki Kabushiki Kaisha, Tokyo, Japan

[21] Appl. No.: 471,398

[22] Filed: Jun. 6, 1995

[30] Foreign Application Priority Data

Sep. 2, 1994 [JP] Japan .................. 6-210077

[51] Int. Cl.$^6$ .................................................. H04B 1/06
[52] U.S. Cl. ............................. 455/276.1; 455/277.1
[58] Field of Search ........................... 455/133, 134, 455/135, 136, 137, 227.1, 227.2, 272, 276.1, 277.1, 277.2, 278

[56] References Cited

U.S. PATENT DOCUMENTS

| | | | |
|---|---|---|---|
| 4,035,729 | 7/1977 | Perry | 455/65 |
| 4,397,036 | 8/1983 | Hirade et al. | 455/137 |
| 5,263,180 | 11/1993 | Hirayama et al. | 455/139 |
| 5,297,168 | 3/1994 | Sant'Agostino et al. | 455/135 |
| 5,349,609 | 9/1994 | Tsujimoto | 455/137 |
| 5,513,222 | 4/1996 | Iwasaki | 455/137 |
| 5,553,102 | 9/1996 | Jasper et al. | 455/137 |

FOREIGN PATENT DOCUMENTS 4-259127  9/1991  Japan.

OTHER PUBLICATIONS

"Fundamentals of Mobile Communications" supervised by Okumara, et al., edited by the Institute of Electronics, Information and Communication Engineers (IEICE), the third edition, Dec. 20, 1988, pp. 161–176.

*Primary Examiner*—Reinhard J. Eisenzopf
*Assistant Examiner*—Marsha D. Banks-Harold
*Attorney, Agent, or Firm*—Wolf, Greenfield & Sacks, P.C.

[57] ABSTRACT

A diversity receiver. Antennas are provided for respective branches. Each of the antennas generates a branch signal by receiving a radio signal through a radio signal path. The paths are different from each other. A reliability extraction circuit is provided to extract the reliability information of respective branch signals from them during an observation period. The observation period is set such that the radio signal paths appear to be equivalent to white noise Gaussian transmission paths, regardless of the occurrence of fading. Normally, the observation period is sufficiently shorter than a variance period of the branch signals due to the fading. After extracting the reliability information, weights for the respective branch signals are determined on the basis of the reliability information. The branch signals are linearly combined in accordance with the weights, and the signal thus obtained is output. As the reliability information, probability information are available. The probability information can be obtained on the basis of envelope levels or carrier power to noise power ratios of the branch signals.

17 Claims, 12 Drawing Sheets

DIVERSITY RECEIVER

BACKGROUND OF THE INVENTION

1. Field of the Invention

This invention relates to a diversity receiver used for radio communication.

2. Description of the Prior Art

A phenomenon which is called fading occurs under circumstances where a plurality of radio transmission paths are produced between a transmitter and a receiver. Assume that radio waves transmitted from a transmitter are received by the same receiver through a first transmission path on one hand and a second transmission path on the other hand. Interference between the radio waves that have traveled via the first transmission path and those which have traveled via the second transmission path varies the envelop and phase of a received signal on a random basis. A fault due to the radio transmission through the plurality of transmission paths is generally called fading. When fading occurs, transmission quality is particularly deteriorated.

For example, fading occurs in environments where there are buildings or natural terrain which reflect or scatter transmitted radio waves. Therefore, it is particularly significant for a system which carries out radio communication with a transmitter or a receiver moving around in a town or on the road, such as mobile communication system. To avoid the transmission quality from being deteriorated as a result of fading, fields of mobile communication and others may adopt diversity reception.

Several types of diversity reception are known. One is designated as space diversity. Space diversity uses a plurality of receiving antennas which are spatially separated and combines signals received by the respective receiving antennas to reduce the effects of fading. Known received signal combining methods for space diversity include selection combining, equal-gain combining, and maximal-ratio combining methods. The maximal-ratio combining method assigns weights in proportion to envelope levels of the respective received signals influenced by fading and combines these received signals at the same time. The maximal-ratio combining method is a method in which a signal-to-noise ratio (hereinafter referred to as carrier-to-noise ratio: C/N) after combining, becomes highest among the various combining methods. Therefore, it is the best from the point of view of improving transmission quality.

FIG. 12 shows the structure of a diversity receiver described in "Fundamentals of Mobile Communications" (in Japanese) supervised by Okumura, et al., edited by the Institute of Electronics, Information and Communication Engineers (IEICE), and first published in 1986 by Corona Publishing Co., Ltd. The receiver of this drawing employs the space diversity method as the diversity method and the maximal-ratio combining method as the received signal combining method. It has two branches or receiving systems.

The first branch consists of an antenna 100, an envelope detector 102, a phase detector 104, a phase shifter 106, and a variable gain amplifier 108. Similarly, the second branch consists of an antenna 101, an envelope detector 103, a phase detector 105, a phase shifter 107, and a variable gain amplifier 109. The antennas 100 and 101 receive a radio signal and feed the received signal to the corresponding phase shifters and variable gain amplifiers in turn. The phase shifters 106 and 107 shift the phases of the signals received from the corresponding antennas, according to the outputs of the corresponding phase detectors. The variable gain amplifiers 108 and 109 amplify the received signals, which have the phases shifted by the corresponding phase shifters, by gains according to the outputs of the corresponding envelope detectors. The two received signals obtained by the phase shifting process and the variable gain amplifying process are added by an adder 110 in the latter stage, then detected and demodulated by a detector 400 in the latter stage. A combined received signal obtained as a result is outputted to a circuit (not shown) through an output 402.

The phase detectors 104 and 105 detect the phases of the signals received by the corresponding antennas. The phase shifts at the phase shifters 108 and 107 are controlled according to the outputs of the corresponding phase detectors as described above. More specifically, the phase shifts at the phase shifters 106 and 107 are controlled by the corresponding phase detectors so that the phase of the received signal outputted from the phase shifter 106 becomes equal to that of the received signal outputted from the phase shifter 109. Thus, the adder 110 can produce an in-phase combination.

Furthermore, the envelope detectors 102 and 103 detect the envelope levels of the signals received by the corresponding antennas. Amplification gains at the variable gain amplifiers 108 and 109 are controlled according to the outputs of the corresponding envelope detectors as described above. More specifically, the amplification gains at the variable gain amplifiers 108 and 109 are controlled so as to be proportional to the envelope levels of the signals received by the corresponding antennas. Such weighting determines a contribution of each branch to the signal outputted from the adder 110 according to the envelope level prior to each variable gain amplification.

The implementation of the diversity receiving by the above circuit can linearly combine the received signals according to the envelope level. Roughly speaking, signals having a high envelope level have a good C/N, so that the combination of the received signals by the adder 110 according to the envelope level can provide a signal having a generally good C/N.

However, the generality "signals having a high envelope level have a good C/N" is not always true for all the received signals. In reality, some received signals, which have a low envelope level, also have a good C/N. In the circuit shown in FIG. 12, a received signal having a low envelope level cannot contribute to the output of the adder 110. Therefore, the conventional maximal-ratio combining method cannot effectively use a radio wave having a good C/N regardless of the receipt of such a radio wave.

Conversely, some received signals, which have a high envelope level, have a poor C/N. This type of signal contributes greatly to the output of the adder 110. Therefore, in the conventional maximal-ratio combining method, the received signal having a poor C/N may make a large contribution, while the output signal of the adder 110 does not have a significant C/N.

Furthermore, when a radio wave is received through a transmission path which is suffering from fading, the received signal has an envelope level which generally varies over a wide range of 50 dB or above. Therefore, when the aforementioned maximal-ratio combining method is used to lower or overcome the effects of fading, the envelope detectors 102 and 103 are required to have high performance, namely "having linearity over a wide dynamic range of 50 dB or above" and at the same time, the variable gain amplifiers 108 and 109 are required to have high performance, namely "capable of controlling the gain over a wide dynamic range of 50 dB or above". This results in complicating the envelope detector circuit, the variable gain amplifier and their peripheral structures, causing a rise in price and difficulty in implementation.

SUMMARY OF THE INVENTION

A first object of the invention is to effectively use "a received signal having a low envelope level and a good C/N" to further improve transmission quality and to preclude "a received signal having a high envelope level and a poor C/N" to further improve transmission quality by detecting a C/N of a signal received by each branch with careful consideration of a variation period of an envelope level.

A second object of the invention is to relieve a demand for an envelope detector to have linearity over a wide dynamic range and a demand for a variable gain amplifier capable of controlling a gain over a wide dynamic range, thereby obtaining good transmission quality by means of the variable gain amplifier which has a simpler structure and is inexpensive.

A third object of the invention is to assign weights to a received signal by a simpler technique.

According to the first aspect of the invention, a diversity receiver comprises a plurality of antennas for generating branch signals by receiving radio signals through a plurality of radio signal paths which are different from each other, means for extracting reliability information of respective branch signals from the respective branch signals during an observation period, the observation period being set sufficiently shorter than a variance period of the branch signals due to fading of radio signals such that the radio signal paths appear to be equivalent to white noise Gaussian transmission paths, means for determining weights for the respective branch signals on the basis of the reliability information, and means for generating a combined received signal by linearly combining the branch signals in accordance with the weights, wherein the reliability information each represent a degree of contribution, to improvement of a signal-power-to-noise-power ratio of the combined received signal, of corresponding branch signals.

According to the second aspect of the invention, there is provided a method for linearly combining branch signals supplied from a plurality of antennas, the plurality of antennas supplying radio signals, received through a plurality of radio signal transmission paths which are different from each other, as the branch signals, the method comprising the steps of extracting reliability information of respective branch signals from the respective branch signals during an observation period, the observation period being set sufficiently shorter than a variance period of the branch signals due to fading of the radio signals such that the radio signal paths appear to be equivalent to white noise Gaussian transmission paths, determining weights for the respective branch signals on the basis of the reliability information, and generating a combined received signal by linearly combining the branch signals in accordance with the weights, wherein the reliability information each represent a degree of contribution, to improvement of a signal-power-to-noise-power ratio of the combined received signal, of corresponding branch signals.

According to the third aspect of the invention, there is provided a circuit for linearly combining branch signals supplied from a plurality of antennas, the plurality of antennas supplying radio signals, received through a plurality of radio signal transmission paths which are different from each other, as the branch signals, the circuit comprising means for extracting reliability information of respective branch signals from the respective branch signals during an observation period, the observation period being set sufficiently shorter than a variance period of the branch signals due to fading of the radio signals such that the radio signal paths appear to be equivalent to white noise Gaussian transmission paths, means for determining weights for respective branch signals on the basis of the reliability information, and means for generating a combined received signal by linearly combining the branch signals in accordance with the weights, wherein the reliability information each represent a degree of contribution, to improvement of a signal-power-to-noise-power ratio of the combined received signal, of corresponding branch signals.

In this invention, reliability information is extracted from the branch signals obtained in accordance with the space diversity method. The extracted reliability information is used to determine weights which are used to linearly combine the branch signals. A signal obtained by the linear combination, or a combined received signal, is supplied to the next step.

Here, in this invention, the reliability information is extracted on the prescribed observation period basis. The observation period is determined to be adequately shorter than the period of a branch signal variation due to fading, and more specifically, so short that fading paths can be assumed to be white noise Gaussian transmission paths. This determination causes the reliability information to be information having C/N quantified, or to be transmission quality information indicating a degree of contribution of the branch signal to the improvement of the C/N of the combined received signal. In this invention weights are determined according to the reliability information, so that it is possible to effectively use "the received signal having a low envelope level and a good C/N" to further improve transmission quality and to preclude "the received signal having a high envelope level and a poor C/N", to thus further improve transmission quality.

The branch signals can be linearly combined by using variable gain amplifiers disposed to correspond to respective branches and an adder for summing the amplified branch signals. In this case, gains of the variable gain amplifiers are determined according to the weight determined for each branch. The variable gain amplifiers can be replaced by multipliers for multiplying a weight and a branch signal. The multipliers simplify the circuit structure compared to when the variable gain amplifiers are used.

To linearly combine the branch signals, the branch signals are matched to have the same phase. To match them, a phase detector and a phase shifter are disposed for each branch to control the operation of the phase shifter according to the phase detected by the corresponding phase detector. In this case, a detector is disposed to detect and demodulate the combined received signal. Alternatively the detector may be disposed for each branch and before a linear combination means. Since the phases of the branch signals can be matched by the detectors, the phase detectors and the phase shifters are no longer required, and weighting can be carried out by a simple technique.

To determine the weight according to the reliability information, an algorithm is needed to convert the reliability information into the weight. For the algorithm, a proportional function and a step function can be used, for example. When the step function is used, the weight determining means has a simple structure.

A first method to obtain the reliability information uses the envelope level. In this method, an envelope detector disposed for each branch is used to detect the envelope level of the corresponding branch signal. Then, the obtained envelope levels are compared between the branches, and an identification signal indicating the result is generated. The number of comparators used for the above purpose is fewer by one than the number of branches. Further, for each branch, and based on the identification signal, a probability that the envelope level of the branch becomes higher than the envelope level of other branch as in a single observation period is determined. The obtained probability information is supplied to weight determination means as reliability information. When the above method is employed to generate reliability information, a performance requirement of the envelope detectors and the variable gain amplifiers can be relieved. In addition, the envelope detection technology used by the conventional method can be used, so that a development cost is low.

The method for generating the probability information based on the envelope levels includes, for example, a step for sampling the identification signal and a step for classifying and counting the sampled data according to its value. A counted value obtained as a result, a time average or moving average obtained by dividing the counted value by a sample number, and time elapsed when the counted value reaches a prescribed value, can be dealt with as the above probability information.

The second method for obtaining the reliability information uses a signal-power-to-noise-power ratio such as C/N. In this case, a signal-power-to-noise-power-ratio detector disposed for each branch detects a signal-power-to-noise-power ratio of the corresponding branch signal. Then, based on the obtained signal-power-to-noise-power ratios, a probability that the signal-power-to-noise-power ratio of the branch becomes higher than the signal-power-to-noise-power ratios of other branches in a single observation period is determined. The obtained probability information is supplied to weight determination means as reliability information. When the above method is employed to generate reliability information, a performance requirement of the variable gain amplifiers can be relieved. Also, a performance requirement of the signal-power-to-noise-power-ratio detector is not strict.

DETAILED DESCRIPTION OF THE PREFERRED EMBODIMENTS

Figure 1:
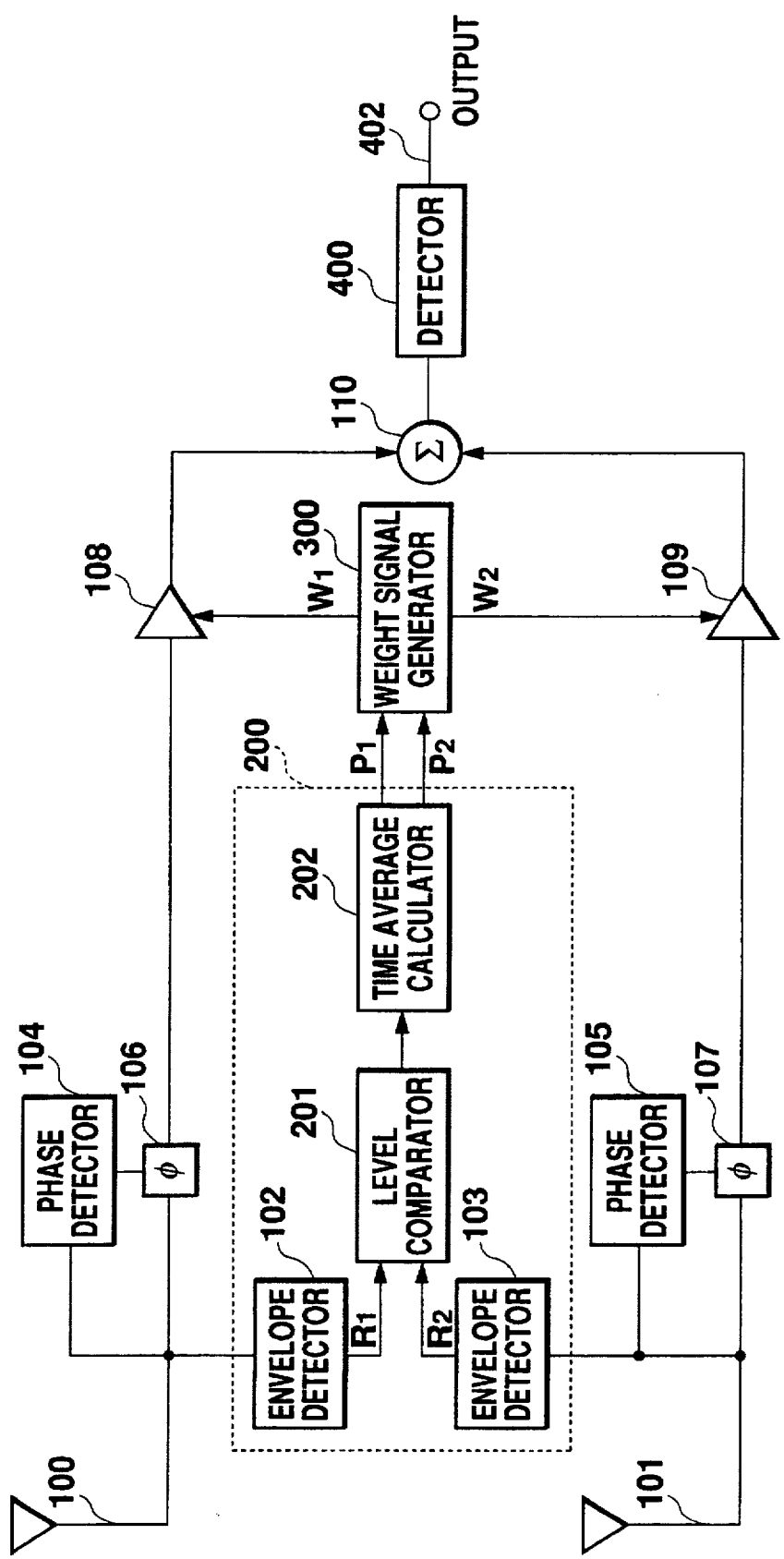
FIG. 1 is a block diagram showing the structure of the diversity receiver according to the first embodiment of the invention.

Preferred embodiments of the invention will be described with reference to the attached drawings. Like or corresponding members as in the aforementioned prior art will be given the same reference numerals and their description will be omitted. Also, common or corresponding members throughout the embodiments will be given the same reference numerals and their description will be omitted.

a) Embodiment 1

FIG. 1 shows the structure of the diversity receiver according to the first embodiment of the invention. This embodiment has two branches disposed in the same way as in the prior art. The first branch consists of an antenna 100, a phase detector 104, a phase shifter 106, and a variable gain amplifier 108. The second branch consists of an antenna 101, a phase detector 105, a phase shifter 107, and a variable gain amplifier 109. These antennas, phase detectors, phase shifters, and variable gain amplifiers have the same functions as those used in the prior art. An adder 110, a detector 400, and an output 402 are disposed to follow the variable gain amplifiers 108 and 109 in the same way as in the prior art.

This embodiment controls gains of the variable gain amplifiers 108 and 109 by a reliability information extractor 200 and a weighting signal generator 300 which are shared by each branch.

Structure and operation of reliability information extractor

The reliability information extractor 200 consists of envelope detectors 102 and 103, a level comparator 201, and a time average calculator 202. The envelope detectors 102 and 103 each detect an envelope level of a signal received by the antenna 100 or 101. In the drawing, an envelope level of the signal received by an antenna belonging to the k-th branch is represented by a symbol Rk. The level comparator 201 compares the envelope levels between the branches. Since this embodiment has two branches, the level comparator 201 judges which is higher between envelope levels R1 and R2. When it is judged that R1 is higher than or equal to R2, the level comparator 201 outputs a signal "0". When R2 is judged to be higher than R1, the level comparator 201 outputs a signal "1".

The time average calculator 202 samples an output signal of the level comparator 201 for every period Ts=T/N (N: sample number, natural number of 2 or more) within a time T adequately shorter than a period of envelope level variation due to fading. The time average calculator 202 counts the number n1 of sampled data having a value "0" and the number n2 of sampled data having a value "1" obtained in the time T. The n1 and n2 obtained by counting indicate a ratio of the time with R1≧R2 or the time with R2>R1 in the time T. The time average calculator 202 calculates P1 and P2 by the following formulae:

P1=n1/N

P2=n2/N.

The P1 and P2 thus obtained each indicate a realized value of a probability that the judgment of R1≧R2 or R2>R1 is made in the time T. Thus, they meet a relation of P1+P2=1. In putting this embodiment into practice, for example n1 is counted, P1 is obtained based on the counted n1, and P2=1−P1 is calculated. The time average calculator 202 supplies these realized values, or time averages P1 and P2, as reliability information to the weighting signal generator 300 in the time T.

Operation of weighting signal generator

Figure 2:
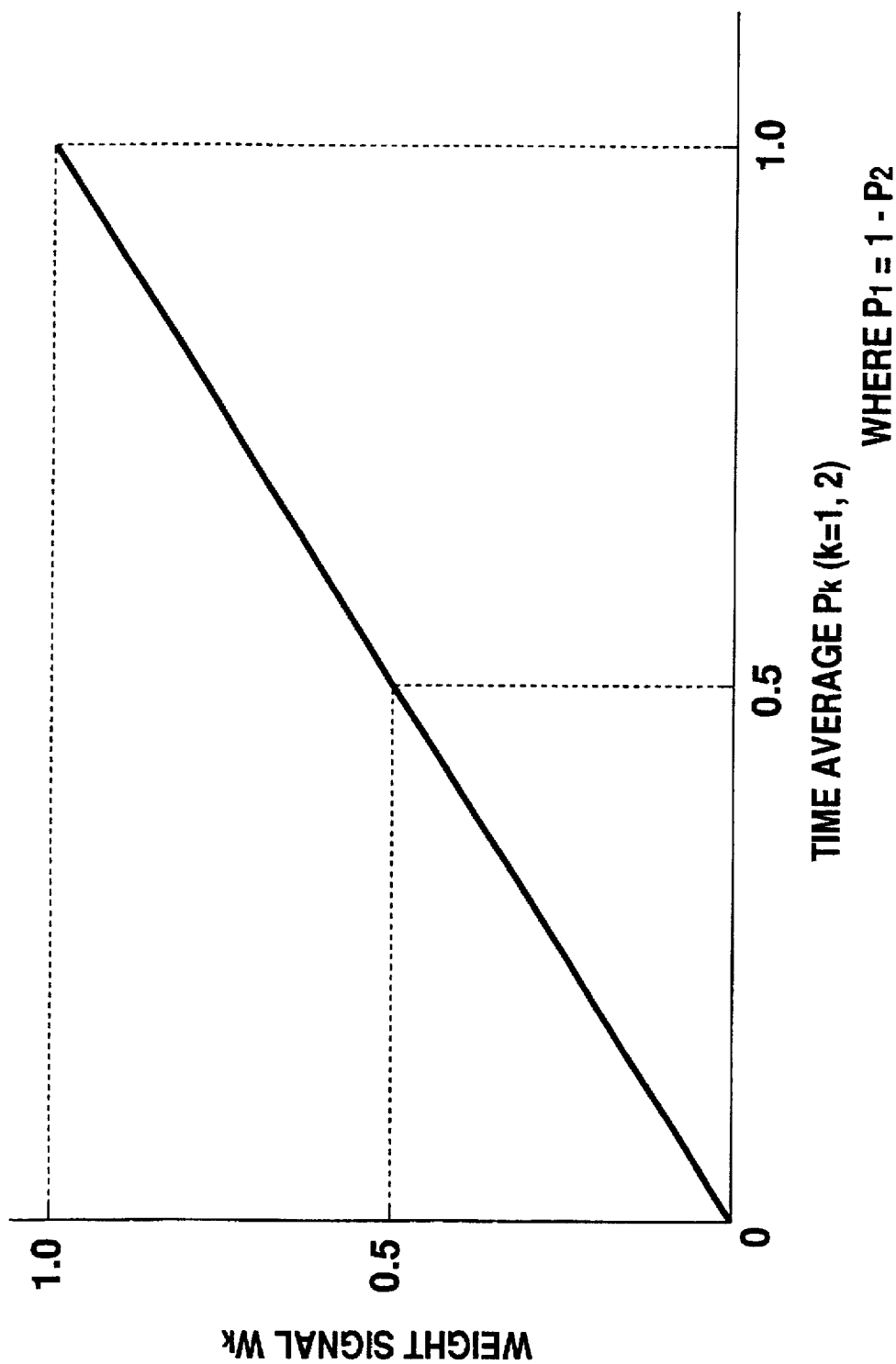
FIG. 2 is a graph showing a conversion principle used to generate k-th weighting signal Wk in the embodiment of FIG. 1.

The weighting signal generator 300 generates weighting signals W1 and W2 by referring to the time averages P1 and P2 to the relation shown in FIG. 2, for example. FIG. 2 uses a relation of Wk=Pk, but more generally, a relation of Wk=αk*Pk can be used (αk is a proportional coefficient with respect to the k-th branch). The weighting signal generator 300 supplies a weighting signal Wk to the variable gain amplifier belonging to the k-th branch. Thus, the amplifying gain at each variable gain amplifier, or a weight given to each branch when the received signals are to be combined, is controlled.

Operation principle

The above described structure can realize a space diversity according to the maximal-ratio combining method. Also, the received signals can be combined with the C/N taken into account, and the equipment can be simply structured. These advantages are based on the following principle.

First, the behavior of an envelope level in a fading channel where fading has occurred will be considered. In a fading channel where fading has occurred, the envelope level varies over a wide range of 50 dB or above. However, this variation is periodical. Therefore, when attention is given to the time T which is adequately shorter than the period of variations in the envelope level due to fading, the envelope level can be assumed to be substantially constant in the time T. Namely, even in the transmission path with fading, if considered for such a short time T, the path appears as equivalent to a white Gaussian noise transmission path without fading.

Figure 3:
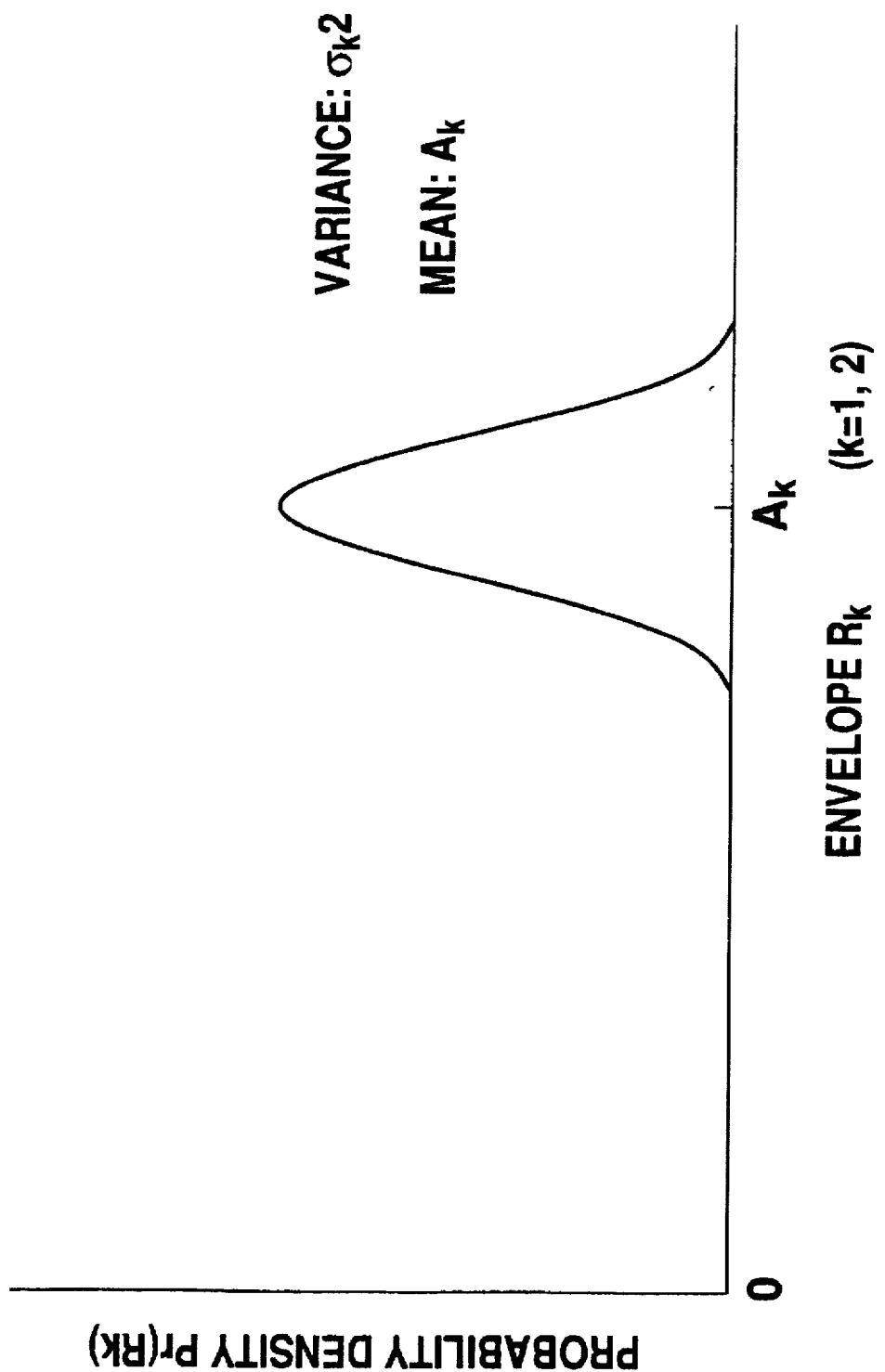
FIG. 3 is a graph showing that a probability density function Pr(Rk) of an envelope level Rk of a signal received by the k-th branch follows Rice distribution.

Here, assume that an antenna belonging to the k-th branch has received a signal through the white Gaussian noise transmission path. Then, a probability distribution function Pr(Rk) of an envelope level Rk of the signal becomes a function indicating the Rice distribution shown in FIG. 3. Further, when a signal amplitude is Ak and noise power is σk$^2$, the probability density function Pr(Rk) can be expressed by the following formula (1). In the formula (1), I0(z) is a zero-order modified Bessel function of the first kind and expressed by the formula (2).

$$P_r(R_K) = \frac{R_K}{\sigma_K^2} \cdot \exp\left(-\frac{A_K^2 + R_K^2}{2\sigma_K^2}\right) \cdot I_0\left(\frac{A_K \cdot R_K}{\sigma_K^2}\right) \quad (1)$$

where, K=1,2, 0<Rk<∞, 0<Ak<∞

$$I_0(z) = \frac{1}{2\pi} \cdot \int_0^{2\pi} \exp(z \cdot \cos\theta) d\theta \quad (2)$$

Figure 4:
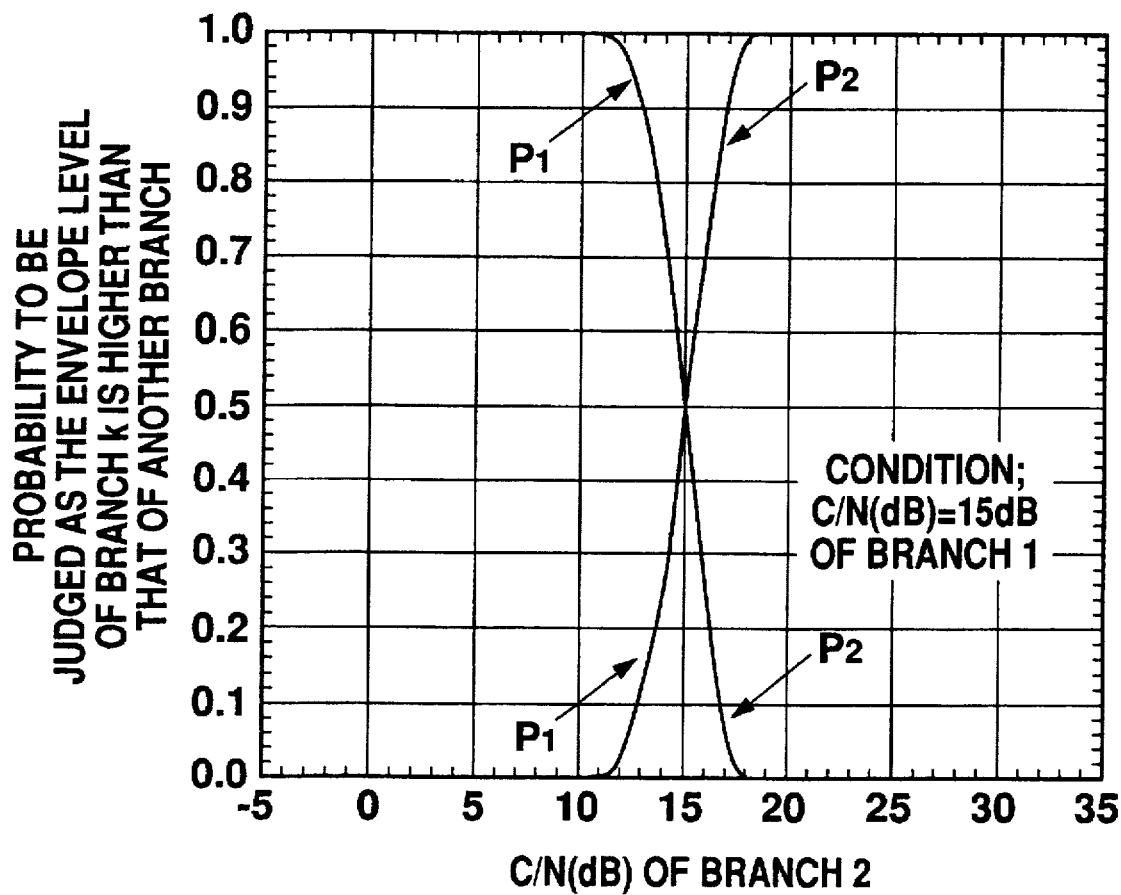
FIG. 4 is a graph showing a probability Pk that when a C/N of a signal received by the first branch is 15 dB, an envelope level Rk of a signal received by the k-th branch is judged to be higher than those of signals received by other branches.

Here, when it is assumed that average noise powers of signals received by the respective antennas are equal to each other, σ1$^2$=σ2$^2$ is formulated. A probability P1 of holding R1≧R2 and a probability P2 of holding R2>R1 are expressed by the formula (3) based on the Marcum Q-function of the formula (4). Variables γ1 and γ2 in the formula (3) are given by the following formula (5) and represent C/N's of the signals received by the antennas belonging to the first and second branches. When γ1 representing the C/N of the first branch is fixed at 15 dB and the C/N or Rk of the second branch is changed, the probabilities P1 and P2 behave as shown in FIG. 4.

$P_2 = \text{Prob}(R_2 > R_1) =$ $\frac{1}{2}\{1 - Q(\sqrt{\gamma_1}, \sqrt{\gamma_2}) + Q(\sqrt{\gamma_2}, \sqrt{\gamma_1})\}$ $P_1 = \text{Prob}(R_1 \geq R_2) = 1 - \text{Prob}(R_2 > R_1)$ $\phantom{P_1} = \frac{1}{2}\{1 + Q(\sqrt{\gamma_1}, \sqrt{\gamma_2}) - Q(\sqrt{\gamma_2}, \sqrt{\gamma_1})\}$ $\sigma_1^2 = \sigma_2^2$ $$Q(a,b) = \int_b^\infty \exp\left(-\frac{a^2 + x^2}{2}\right) \cdot I_0(a - x) \cdot x dx \quad (3)$$

$\gamma_1 = A1^2/(2\sigma_1^2)$ \quad (4)
$\gamma_2 = A2^2/(2\sigma_2^2)$ \quad (5)

Thus, the probabilities P1 and P2 are dependent on the C/N of the received signals. Therefore, when the probabilities P1 and P2 are determined and the variable gain amplifiers 108 and 109 are controlled according to the determined probabilities P1 and P2, a high weight (high amplification gain) can be given to the output of a branch having a relatively high envelope level and also to the output of a branch having a relatively high C/N. Consequently, "the received signal having a low envelope level and a good C/N" can be effectively used to improve transmission quality, and effects of "the received signal having a high envelope level and a poor C/N" can be prevented in order to improve transmission quality.

Furthermore, the envelope detectors 102 and 103 in this embodiment have linearity to an extent sufficient for judging a level by the level comparator 210. Namely, this embodiment does not need envelope detectors having linearity over a very wide dynamic range, unlike the prior art. Besides, in this embodiment, the dynamic ranges of the variable gain amplifiers 108 and 109 are determined according to a sample number N. For example, when the sample number N is 18, the variable gain amplifiers 108 and 109 have a dynamic range of 20log16=24 dB. Therefore, this embodiment does not need to use a variable gain amplifier capable of controlling a gain over a wide dynamic range of 50 dB or more, unlike the prior art. Thus, a circuit structure can be simplified, and a diversity receiver which is inexpensive and provides good transmission quality can be attained.

b) Embodiment 2

Figure 5:
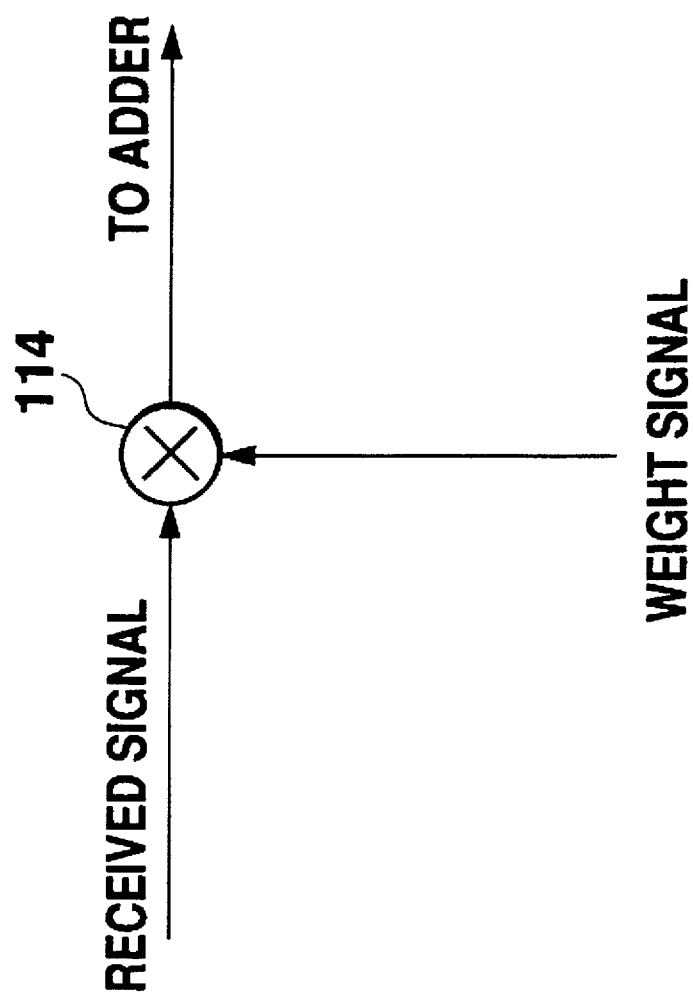
FIG. 5 is a view showing an example of the circuit used for weighting in the second embodiment of the invention.

FIG. 5 shows an essential structure of the diversity receiver according to the second embodiment of the invention. This embodiment has substantially the same structure as in the first embodiment except that the variable gain amplifiers of FIG. 1 are replaced by multipliers 114 as shown in FIG. 5. The structure of FIG. 5 can give a weight to the corresponding received branch signal by a simpler process than the first embodiment.

c) Embodiment 3

Figure 6:
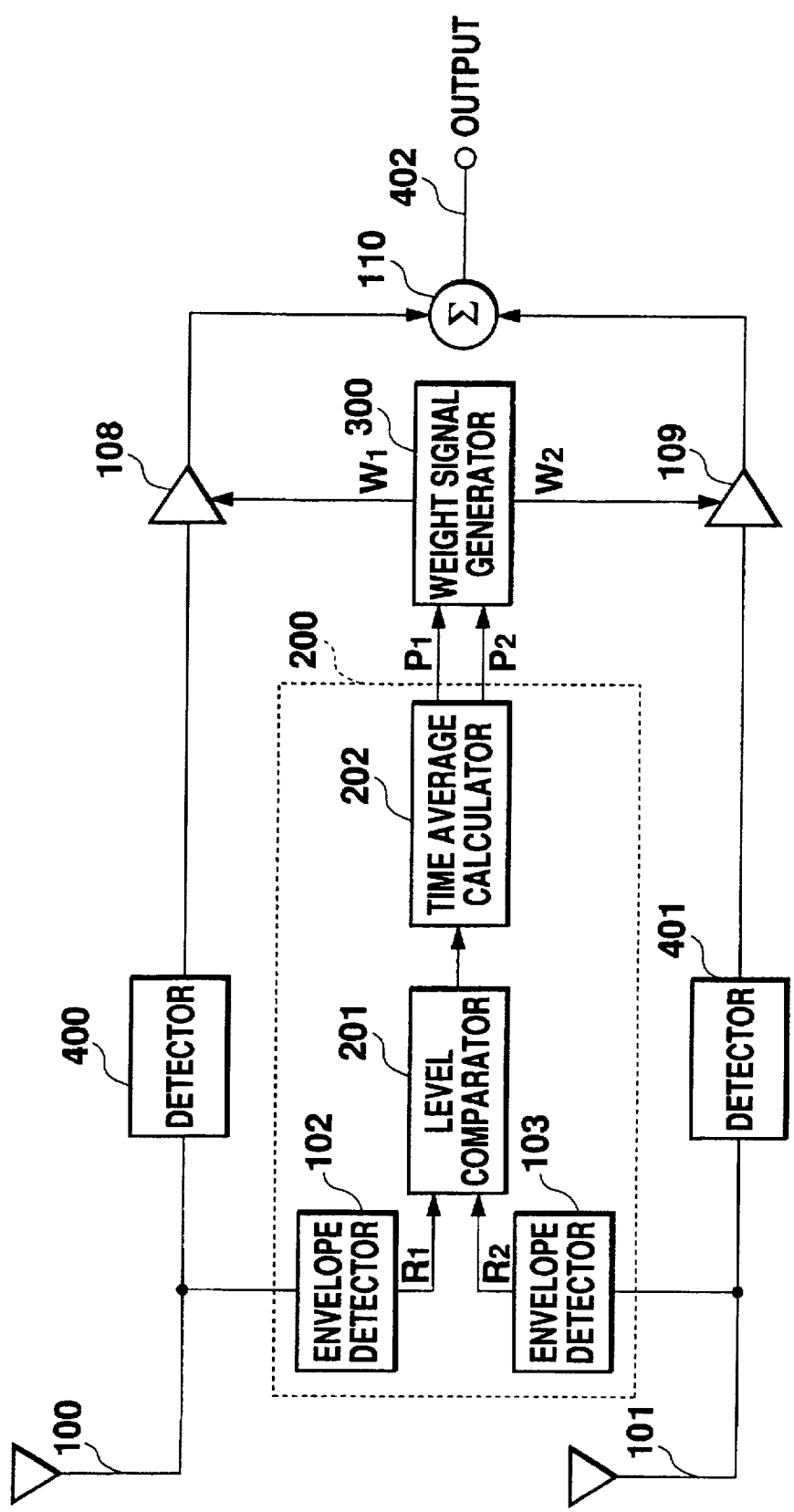
FIG. 6 is a block diagram showing the structure of the diversity receiver according to the third embodiment of the invention.

FIG. 6 shows a structure of the diversity receiver according to the third embodiment of the invention. Detectors 400 and 401 of this embodiment are disposed differently from the detector 400 of the first embodiment. Namely, the detectors 400 and 401 are respectively arranged at forestages of the amplifiers 108 and 109 in respective branches. Besides, the phase detectors and phase shifters are not provided in this embodiment, since the detectors 400 and 401 execute the phase difference compensation process and therefore the phases of detected received signals in respective branches are in-phase with each other.

As a result, in this embodiment, the same advantages as the first embodiment are also realized. In addition, the phase difference compensation process by the phase detector and the phase shifter can be eliminated, so that weights can be given to the received signals by a simpler process than the first embodiment.

d) Embodiment 4

Figure 7:
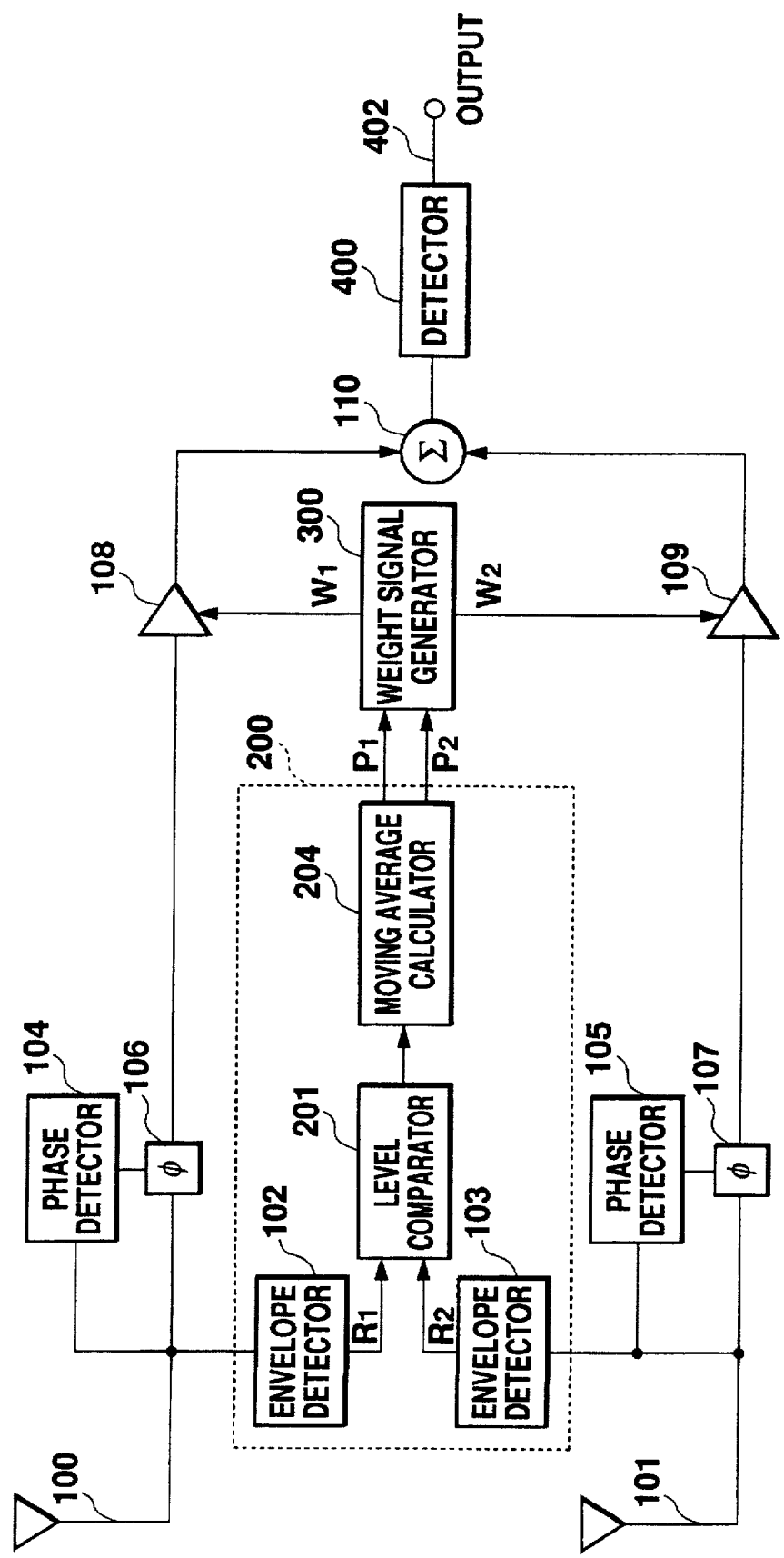
FIG. 7 is a block diagram showing the structure of the diversity receiver according to the fourth embodiment of the invention.

FIG. 7 shows a structure of the diversity receiver according to the fourth embodiment of the invention. This embodiment uses a moving average calculator 204 instead of the time average calculator of the first embodiment. Namely, the first embodiment calculates a time average in the time T after a lapse of every time T, while this embodiment calculates an average of N data sampled in the time T immediately before a present time, or a moving average, after a lapse of every sampling period Ts. The moving average calculated is supplied to the weighting signal generator 300 as a realized value of the probabilities P1 and P2 which is reliability information.

Structuring as described above can realize a diversity receiver having the same advantages as the first embodiment. Besides, since the moving average is used instead of the time average, the follow-up property to the envelope level variations is better than in the first embodiment.

e) Embodiment 5

Figure 8:
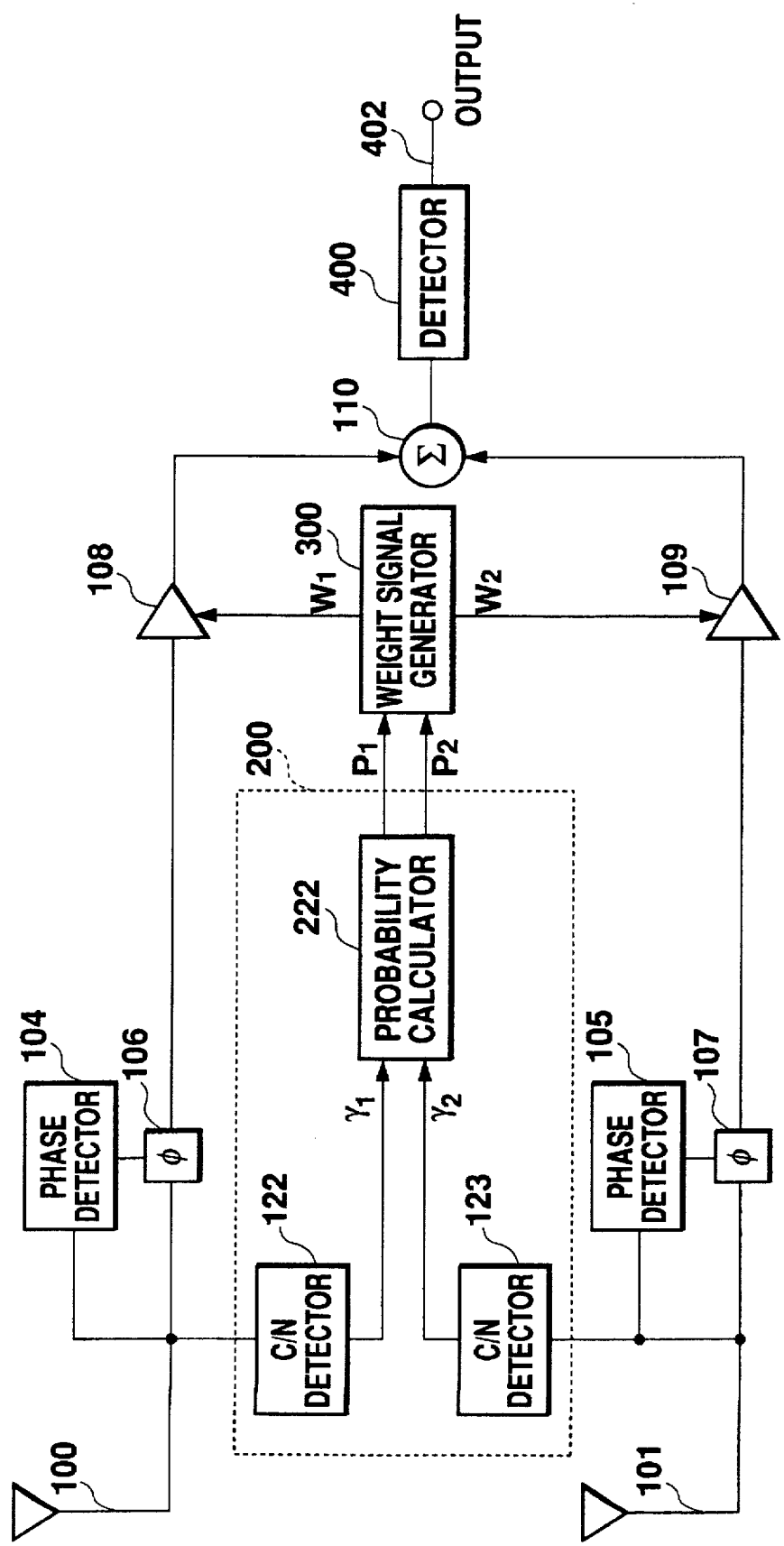
FIG. 8 is a block diagram showing the structure of the diversity receiver according to the fifth embodiment of the invention.

FIG. 8 shows a structure of the diversity receiver according to the fifth embodiment of the invention. This embodiment uses C/N detectors 122 and 123 instead of the envelope detectors 102 and 103 of the first embodiment, and a probability calculator 222 instead of the level comparator 201 and the time average calculator 202.

The C/N detectors 122 and 123 each detect a C/N from a signal received by a corresponding antenna 100 or 101. The C/N detectors 122 and 123 can be realized by a circuit, e.g., a spectrum analyzer, which can measure a received signal power (carrier power) and a noise power. The probability calculator 222 calculates probabilities P1 and P2 by substituting C/Ns, or γ1 and γ2, detected by the C/N detectors 122 and 123 into the formula (3). The probability calculator 222 outputs the obtained probabilities P1 and P2 to a weighting signal generator 300.

Structuring as described above can realize the maximal-ratio combining method on the basis of not the envelope level but the C/N. Therefore, a better transmission quality than in the prior art can be realized.

f) Embodiment 6

Figure 9:
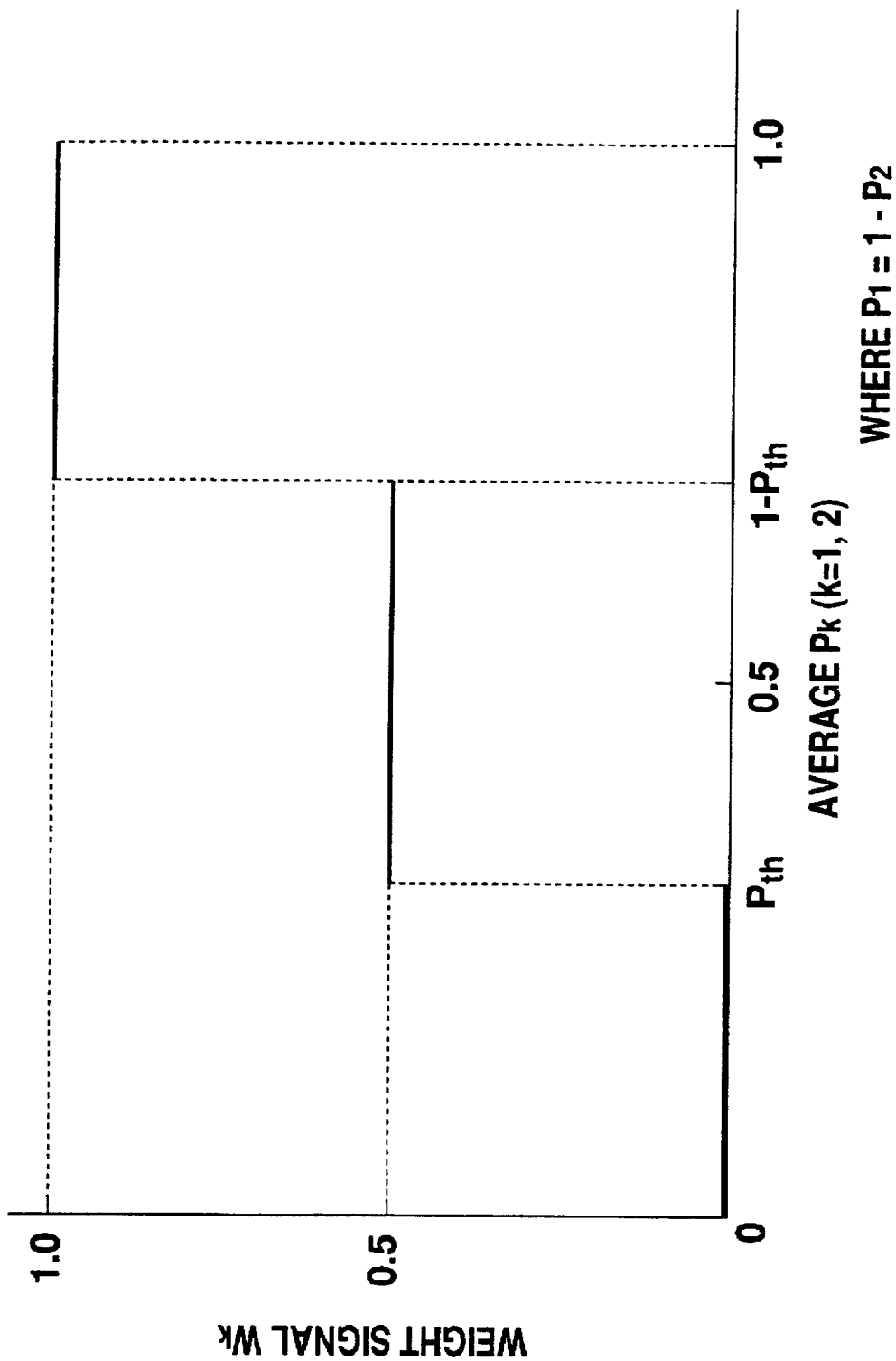
FIG. 9 is a graph showing a conversion principle used to generate k-th weighting signal Wk in the sixth embodiment of the invention.

FIG. 9 shows operation of the weighting signal generator 300 of the sixth embodiment of the invention. In this embodiment, a weighting signal Wk varies stepwise at two threshold values Pth and 1-Pth. Namely, transformation formulae (6) from reliability information Pk to the weighting signal Wk are expressed as follows. But, the threshold value Pth is set so that a relatively good diversity effect is obtained when the reliability information Pk is in an area on or above Pth.

$W1=1, W2=0$ for $1-Pth<P1<1$ and $0 \leq P2<Pth$ $W1=W2=0.5$ for $Pth \leq P1$ and $P2 \leq 1-Pth$ $W1=0, W2=1$ for $0 \leq P1<Pth$ and $1-Pth<P2 \leq Pth$ (6)

Thus, the same effects as in the first embodiment can be obtained. Besides, the weighting signal generator 300 has a simple operation principle compared with the first embodiment, so that the weighting signal generator 300 has a very simple circuit structure.

g) Embodiment 7

Figure 10:
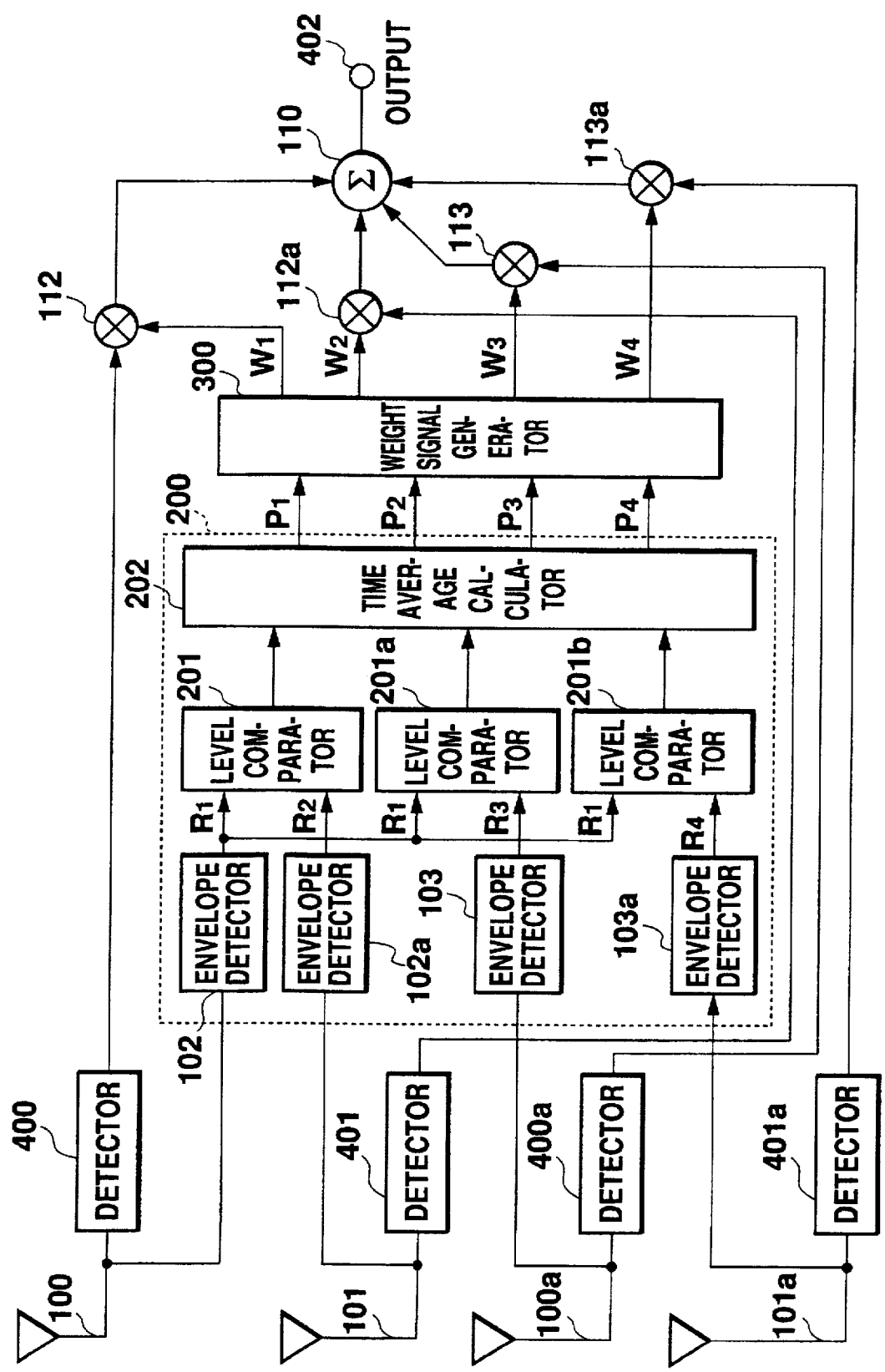
FIG. 10 is a block diagram showing the structure of the diversity receiver according to the seventh embodiment of the invention.

FIG. 10 shows a structure of the diversity receiver according to the seventh embodiment of the invention. This embodiment is a combination of the second and third embodiments with the number of branches increased to four. FIG. 10 shows circuits, which have been increased in conformity with the increased number of branches, with symbols a, b and others added to the reference numerals used in the second and third embodiments for the circuits having the same functions. Also, three level comparators, i.e., 201, 201a and 201b, which have been disposed as the branches have been increased, carry out the comparison operation expressed by the formulae (7), respectively.

Level comparator 201: output="0" for $R1 \geq R2$

"1" for $R2 > R1$

Level comparator 201a: output="0" for $R1 \geq R3$

"1" for $R3 > R1$

Level comparator 201b: output="0" for $R1 \geq R4$

"1" for $R4 > R1$ (7)

A time average calculator 202 samples an output signal of each level comparator at a sampling period Ts for a time T, and counts the number of times the sampling data value becomes "0" and the number of times the sampling data value becomes "1" for each level comparator. Therefore, what is obtained by counting is number n1 of data indicating $R1 > R2$, number n2 of data indicating $R2 > R1$, number n1a of data indicating $R1 > R3$, number n3 of data indicating $R3 > R1$, number n1b of data indicating $R1 > R4$, and number n4 of data indicating $R4 > R1$. Relations of $n2 = N - n1$, $n3 = N - n1a$ and $n4 = N - n1b$ may be used to partly obviate the counting operation.

Besides, the time average calculator 202 uses the following formulae (8) to calculate a probability P1 that R1 is judged to be maximum among four envelope levels R1 to R4, a probability P2 that R2 is judged to be maximum, a probability P3 that R3 is judged to be maximum, and a probability P4 that R4 is judged to be maximum.

$P1 = N1/(N1+N2+N3+N4)$ $P2 = N2/(N1+N2+N3+N4)$ $P3 = N3/(N1+N2+N3+N4)$ $P4 = N4/(N1+N2+N3+N4)$ where, $N1 = n1 * n1a * n1b$ $N2 = n2 * n1a * n1b$ $N3 = n3 * n1a * n1b$ $$N4=n4*n1_a*n1_b \qquad (8)$$

A weighting signal generator 300 generates weighting signals W1 to W4 in the same way as in the previous embodiments based on the obtained reliability information P1 to P4 as above. These weighting signals W1 to W4 are each multiplied by the received signal of each branch in corresponding multipliers. An adder 110 sums the outputs of these multipliers.

Thus, this embodiment can realize the same effects as in the previous embodiments for diversity having three or more branches.

h) Embodiment 8

Figure 11:
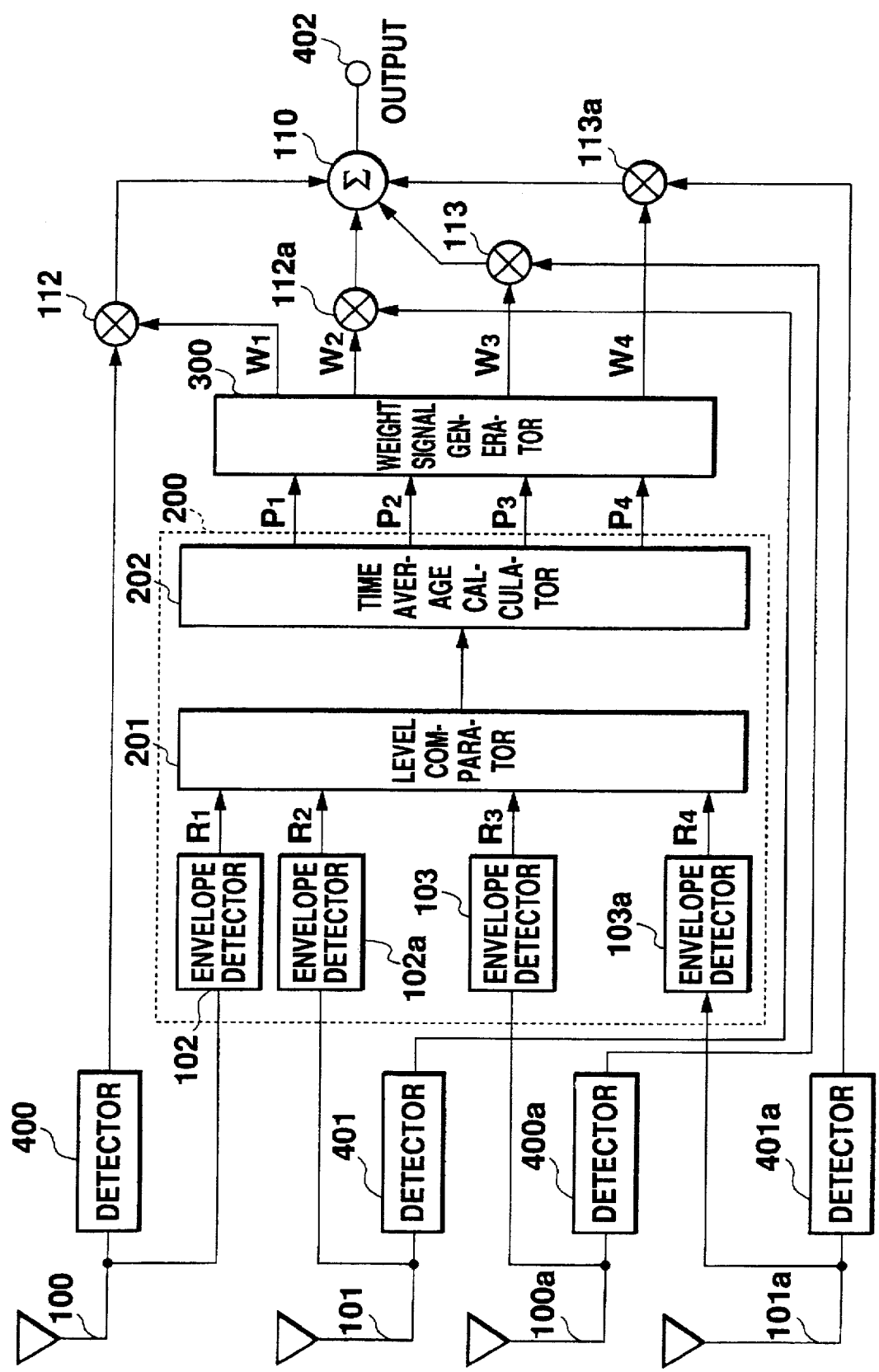
FIG. 11 is a block diagram showing the structure of the diversity receiver according to the eighth embodiment of the invention.
Figure 12:
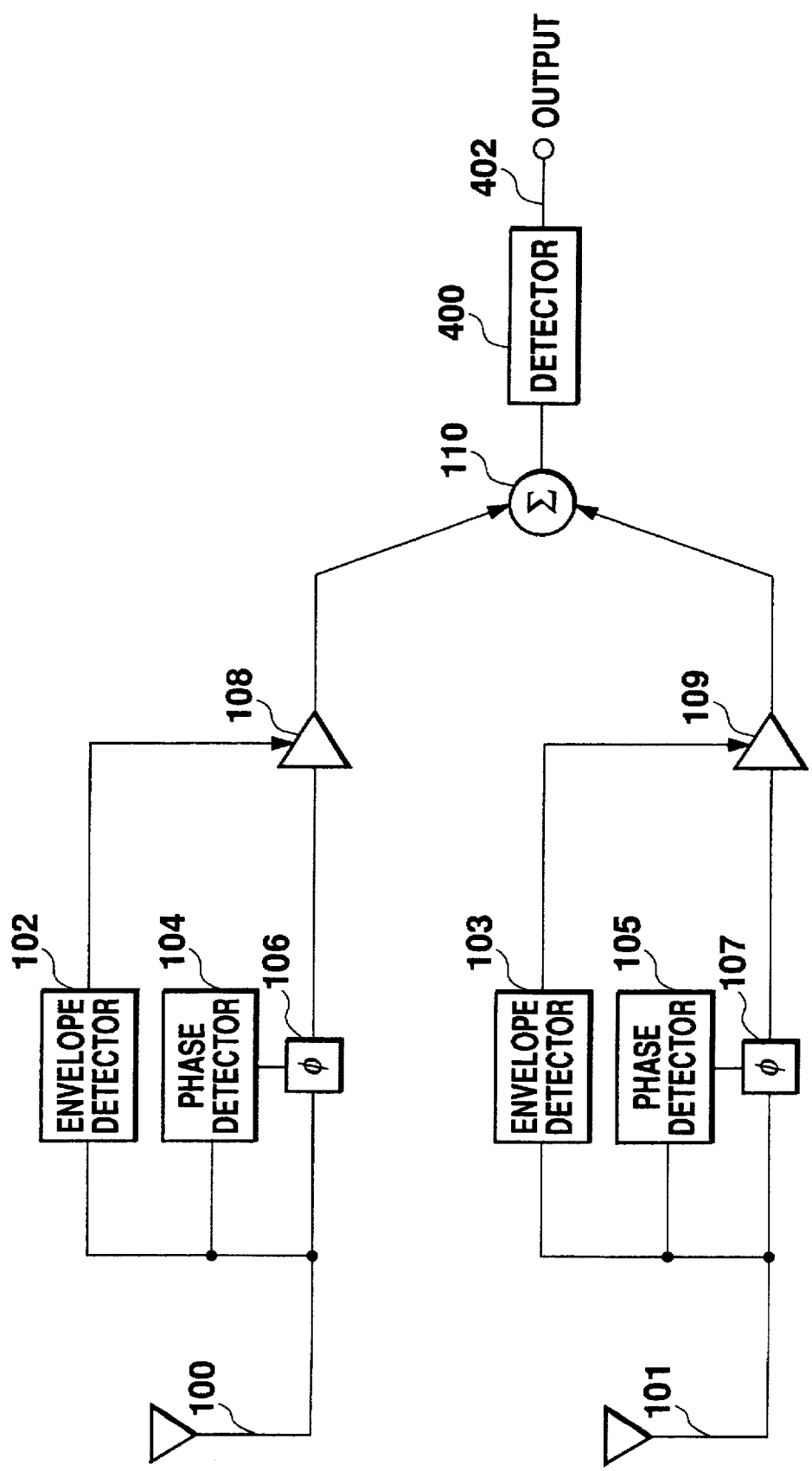
FIG. 12 is a block diagram showing the structure of the diversity receiver according to prior art.

FIG. 11 shows a structure of the diversity receiver according to the eighth embodiment of the invention. This embodiment is common to the seventh embodiment in the point that the second and third embodiments are combined with the branches increased to four. However, this embodiment uses only one level comparator 201.

The level comparator 201 judges the highest level among the outputs of four envelope detectors, or envelope levels R1 to R4. The level comparator 201 outputs a signal of a value "0" when the envelope level R1 is judged to be highest, a signal of a value "1" when the envelope level R2 is judged to be highest, a signal of a value "2" when the envelope level R3 is judged to be highest, and a signal of a value "3" when the envelope level R4 is judged to be highest.

A time average calculator 202 samples the output signals of the level comparator 201 in a sampling period Ts=T/N sufficiently shorter than a time T. The time average calculator 202 counts data number n1 of a value "0", data number n2 of a value "1", data number n3 of a value "2", and data number n4 of a value "3" with respect to sampling data obtained within the time T. The time average calculator 202 divides n1 to n4 each by N to generate time averages P1 to P4 which ought to be reliable information. Since n1+n2+n3+n4=N, counting can be omitted for one of n1 to n4.

i) Supplement

The above embodiments may be easily combined appropriately by those skilled in the art based on the disclosure of the invention. For example, the variable gain amplifier for controlling a gain and the multiplier can be replaced mutually. Further, selection of whether the gain control is effected before or after the detection can be made easily by those skilled in the art who have read the disclosure of the invention. The same also applies to the selection between the time average and the moving average, and between a proportional formula and a discrete weighting formula for the transformation formula from reliability information to weighting signals.

The relationship between the reliability information and the weighting signals is not limited by the proportional relation or the discrete weighting relation. The order of the phase difference compensation process based on the phase detector output and the gain control based on the weighting signal may be replaced. The sixth embodiment has set a pair of threshold values Pth and 1−Pth, but a plurality of pairs may be set.

The first and other embodiments have determined the time average nk/N and used it as reliability information. However, the counted value nk may be used as it is as reliability information. Furthermore, the length of time that the counted value nk reaches a prescribed value may be counted and used as reliability information.

It is to be understood that the number of branches is not limited to two or four.

I claim:

1. A diversity receiver comprising:
   a plurality of antennas for generating branch signals by receiving radio signals through a plurality of radio signal paths which are different from each other,
   means for extracting reliability information of respective branch signals from the respective branch signals generated during an observation period, the observation period being set sufficiently shorter than a variance period of the branch signals due to fading of radio signals such that the radio signal paths appear to be equivalent white noise Gaussian transmission paths,
   means for determining weights for the respective branch signals on the basis of the reliability information from the reliability extracting means, and
   means for generating a combined received signal by linearly combining the branch signals in accordance with the determined weights,
   wherein the extracted reliability information each represent a degree of contribution, to improvement of a signal-power-to-noise-power ratio of the combined received signal, of a corresponding branch signal; and
   wherein the reliability extraction means includes:
      a plurality of envelope detectors, each corresponding to one of the branch signals, for detecting envelope levels of corresponding branch signals,
      a level comparator for comparing the envelope levels between the branch signals and also for outputting an identification signal representative of a comparison result, and
      means for generating, for respective branch signals, probability information each representing a probability that a corresponding envelope level is higher than others during the observation period, on the basis of the identification signal, and the probability information generating means also for supplying the probability information as the reliability information to the weight determination means.

2. A diversity receiver according to claim 1, wherein the linear combination means includes:
   a plurality of variable gain amplifiers, each corresponding to one of the branch signals, for amplifying the corresponding branch signals at gains in accordance with corresponding weights, respectively, and
   an adder for adding the branch signals after amplification.

3. A diversity receiver according to claim 1, wherein the linear combination means includes:
   a plurality of multipliers, each corresponding to one of the branch signals, for multiplying the corresponding branch signals by corresponding weights, respectively, and
   an adder for adding the branch signals after multiplication by the corresponding weights.

4. A diversity receiver according to claim 1, wherein the linear combination means includes:
   a plurality of phase detectors, each corresponding to one of the branch signals, for detecting phases of corresponding branch signals, respectively,
   a plurality of phase shifters, each corresponding to one of the branch signals, for phase-shifting corresponding branch signals in accordance with the phases of the corresponding branch signals, respectively, and
   an adder for adding the branch signals after phase-shifting.

5. A diversity receiver according to claim 1, further comprising a detector for detecting and demodulating the combined received signal.

6. A diversity receiver according to claim 1, further comprising a plurality of detectors, each corresponding to one of the branch signals, for detecting and demodulating corresponding received signals and also for supplying detected and demodulated branch signals as the branch signals to the linear combination means after making the phases thereof even.

7. A diversity receiver according to claim 1, wherein the weight determination means determines the weights for respective branch signals by converting each of the reliability information to a corresponding one of the weights using a predetermined conversion algorithm.

8. A diversity receiver according to claim 7, wherein the predetermined conversion algorithm has a form of a simple proportion.

9. A diversity receiver according to claim 7, wherein the predetermined conversion algorithm has a form of a step function.

10. A diversity receiver according to claim 1, wherein the probability information generating means includes:

means for sampling the identification signal for every sampling period which is one N-th of the observation period, where N is a natural number larger than 1, means for counting, for respective branch signals, numbers of sampled data which represent that the envelope levels of corresponding branch signals are larger than those of other branch signals, and means for outputting count values for respective branch signals as the probability information thereof.

11. A diversity receiver according to claim 1, wherein the probability information generating means includes:

means for sampling the identification signal for every sampling period which is one N-th of the observation period, where N is a natural number larger than 1, means for counting, for respective branch signals, numbers of sampled data which represent that the envelope levels of corresponding branch signals are larger than those of other branch signals, means for calculating ratios of count values to N for respective branch signals, and means for outputting them as the probability information thereof.

12. A diversity receiver according to claim 11, wherein the ratios are calculated as time averages for every observation period.

13. A diversity receiver according to claim 11, wherein the ratios are calculated as moving averages for latest N samples.

14. A diversity receiver according to claim 1, wherein the probability information generating means includes:

means for sampling the identification signal for every sampling period which is one N-th of the observation period, where N is a natural number larger than 1, means for counting, for respective branch signals, numbers of sampled data which represent that the envelope levels of corresponding branch signals are larger than those of other branch signals, means for counting, for respective branch signals, sampling periods required for corresponding count values to reach a predetermined value, and means for outputting said required sampling periods as the probability information thereof.

15. A diversity receiver according to claim 1, wherein the number of branch signals is larger than 2, and the reliability extraction means further includes:

a plurality of comparators, being provided correspondingly to respective branch signals except for one of the branch signals, for comparing the envelope levels of the corresponding branch signals to that of said one of the branch signals and also for outputting an identification signal representative of a comparison result.

16. A method for linearly combining branch signals supplied from a plurality of antennas, the plurality of antennas supplying radio signals, received through a plurality of radio signal transmission paths which are different from each other, as the branch signals, the method comprising the steps of:

extracting reliability information of a respective branch signal based on the respective branch signal and a branch signal of at least one of the other branches generated during an observation period, the observation period being set sufficiently shorter than a variance period of the branch signals due to fading of radio signals such that the radio signal paths appear to be equivalent to white noise Gaussian transmission paths;

determining weights for the respective branch signals on the basis of the reliability information, and generating a combined received signal by linearly combining the branch signals in accordance with the determined weights, wherein the extracted reliability information each represent a degree of contribution, to improvement of a signal-power-to-noise-power ratio of the combined received signal, of a corresponding branch signal, and wherein the step of extracting reliability information comprises steps of:

detecting envelope levels of corresponding branch signals;

comparing the envelope levels between the branch signals;

outputting an identification signal representative of an envelope level comparison result: and generating, for respective branch signals, probability information each representing a probability that a corresponding envelope level is higher than others during the observation period, on the basis of the identification signal, and supplying the probability information as the reliability information to the weight determining step.

17. A circuit for linearly combining branch signals supplied from a plurality of antennas, the plurality of antennas supplying radio signals, received through a plurality of radio signal transmission paths which are different from each other, as the branch signals, the circuit comprising:

means for extracting reliability information of a respective branch signal based on the respective branch signal and a branch signal of at least one of the other branches generated during an observation period, the observation period being set sufficiently shorter than a variance period of the branch signals due to fading of radio signals such that the radio signal paths appear to be equivalent to white noise Gaussian transmission paths;

means for determining weights for the respective branch signals on the basis of the extracted reliability information from the reliability information extraction means; and means for generating a combined received signal by linearly combining the branch signals in accordance with the determined weights, wherein the means for extracting reliability information includes:

means for detecting envelope levels of corresponding branch signals;

means for comparing the envelope levels between the branch signals;

means for outputting an identification signal representative of a comparison result; and means for generating, for respective branch signals, probability information each representing a probability that a corresponding envelope level is higher than others during the observation period, on the basis of the identification signal, and supplying the probability information as the reliability information to the weight determination means, wherein the extracted reliability information each represent a degree of contribution, to improvement of a signal-power-to-noise-power ratio of the combined received signal, by a corresponding branch signal.

* * * * *

UNITED STATES PATENT AND TRADEMARK OFFICE
CERTIFICATE OF CORRECTION

PATENT NO. : 5,697,083
DATED : December 9, 1997
INVENTOR(S) : Hiroyasu Sano

It is certified that error appears in the above-identified patent and that said Letters Patent is hereby corrected as shown below:

Column 2, line 13 change "108" to -- 106 --;

line 20 change "109" to -- 106 --.

Column 8, line 27 move "(3)" to line 26 beside the formula $\sigma_1^2 = \sigma_2^2$;

lines 29 and 30, change "$I_o (a - x)$" to -- $I_o (a \cdot x)$ -- and move (4) to the end of this formula.

line 49 change "210" to -- 201 --;

line 54 change "18" to -- 16 --.

Signed and Sealed this

Nineteenth Day of May, 1998

*Attest:*

BRUCE LEHMAN

*Attesting Officer*  Commissioner of Patents and Trademarks